United States Patent
Ji et al.

(10) Patent No.: US 10,243,656 B2
(45) Date of Patent: *Mar. 26, 2019

(54) AUTHENTICATION FOR WIRELESS LOCAL AREA NETWORKS

(71) Applicant: International Business Machines Corporation, Armonk, NY (US)

(72) Inventors: Zi Lian Ji, Shanghai (CN); Tao Jiang, Shanghai (CN); Xian Dong Meng, Shanghai (CN); George J. Romano, Rochester, MN (US); Zhi Qiang Wei, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 296 days.

This patent is subject to a terminal disclaimer.

(21) Appl. No.: 15/230,568

(22) Filed: Aug. 8, 2016

(65) Prior Publication Data

US 2018/0041896 A1    Feb. 8, 2018

(51) Int. Cl.
| | |
|---|---|
| H04B 10/2575 | (2013.01) |
| H04W 12/06 | (2009.01) |
| H04W 4/02 | (2018.01) |
| G06Q 20/32 | (2012.01) |
| H04L 29/06 | (2006.01) |
| H04W 12/04 | (2009.01) |
| H04W 84/12 | (2009.01) |
| H04W 88/08 | (2009.01) |
| H04W 92/12 | (2009.01) |

(52) U.S. Cl.
CPC ... *H04B 10/25752* (2013.01); *G06Q 20/3224* (2013.01); *H04L 63/0876* (2013.01); *H04L 63/18* (2013.01); *H04W 4/02* (2013.01); *H04W 12/04* (2013.01); *H04W 12/06* (2013.01); *H04L 63/1441* (2013.01); *H04W 84/12* (2013.01); *H04W 88/08* (2013.01); *H04W 92/12* (2013.01)

(58) Field of Classification Search
CPC .................................................. H04W 12/06
USPC ............................................................ 726/6
See application file for complete search history.

(56) References Cited

U.S. PATENT DOCUMENTS

| | | | |
|---|---|---|---|
| 9,941,964 B2 * | 4/2018 | Ji | H04B 10/25752 |
| 2015/0102733 A1 | 4/2015 | Knapp et al. | |
| 2015/0147067 A1 | 5/2015 | Ryan et al. | |
| 2015/0318922 A1 | 11/2015 | Poola et al. | |

(Continued)

FOREIGN PATENT DOCUMENTS

WO    2014085128 A1    6/2014

OTHER PUBLICATIONS

Deboer; "LIFI Lamp Technology Primer"; Audioholics; Aug. 27, 2007; 5 pages; <http://www.audioholics.com/hdtv-formats/lifi-lamp-technology-primer>.

(Continued)

*Primary Examiner* — Jacob Lipman
(74) *Attorney, Agent, or Firm* — Aaron N. Pontikos

(57) ABSTRACT

A digital credential is generated for a user device. The digital credential is transmitted to the user device via an optical wireless communication access point (OWC AP). The user device is located in a coverage area of the OWC AP. The digital credential is provided to a wireless local area network (WLAN AP) associated with the OWC AP for authentication of a request from the user device to access the WLAN.

12 Claims, 5 Drawing Sheets

(56) References Cited

U.S. PATENT DOCUMENTS

2016/0248506 A1 8/2016 Ryan et al.
2016/0352751 A1 12/2016 Perrufel et al.

OTHER PUBLICATIONS

Shao et al.; "Design of a visible-light-communication enhanced WiFi system"; Mar. 10, 2015; pp. 1-10.
Vanhemert; "A High-Tech Chandelier That Visualizes Any Data Stream You Like"; Apr. 29, 2014; 5 pages; <http://www.wired.com/2014/04/a-high-tech-chandelier-that-visualizes-any-data-stream-you-like/>.
"Li-Fi"; Wikipedia, the free encyclopedia; last modified on Jun. 23, 2016; 5 pages; <https://en.wikipedia.org/wiki/Li-Fi>.
"Wi-Fi"; Wikipedia, the free encyclopedia; last modified on Jul. 6, 2016; 15 pages; <https://en.wikipedia.org/wiki/Wi-Fi>.
Appendix P—List of IBM Patents or Patent Applications Treated as Related, Filed Herewith, 2 Pages.
Ji et al., "Authentication for Wireless Local Area Networks", U.S. Appl. No. 15/667,949 filed Aug. 3, 2017, 21 pages.

* cited by examiner

AUTHENTICATION FOR WIRELESS LOCAL AREA NETWORKS

BACKGROUND OF THE INVENTION

The present disclosure relates to wireless technology and more specifically, to using wireless local area networks (WLAN) for the authentication of payment systems.

Wireless local area network (WLAN) is widely used in public spaces, such as restaurants, airports, hotels, and the like. In the public spaces, one or more access points (APs) of a WLAN may be deployed to facilitate access of users to the Internet via one of the APs. To ensure the network security, some WLAN adopts complicated authentication procedures so that only authenticated users are allowed to access the WLAN. At present, the authentication procedure has to get multiple parties involved, such as the user, the AP, the authentication server, and the mobile operator.

SUMMARY

According to one embodiment of the present invention, a method for authenticating information over wireless local area networks (WLANs) comprises: generating, by one or more processors, a digital credential for a user device, wherein the digital credential is used to access the WLAN; transmitting, by one or more processors, the digital credential to the user device using an optical wireless communication access point (OWC AP), wherein the user device is located in a coverage area of the OWC AP; and sending, by one or more processors, information associated with the digital credential to a WLAN AP associated with the OWC AP, in order to authenticate a request from the user device to access the WLAN.

According to another embodiment, a computer system is provided for authenticating information over wireless networks (WLANs). The computer system includes a processing unit and a memory coupled to the processing unit and storing instructions thereon. The instructions can be executed by the processing unit to perform actions including: generating a digital credential for a user device, the digital credential being used to access a wireless local area network (WLAN); transmitting the digital credential to the user device via an optical wireless communication (OWC) access point (AP), the user device being located in a coverage area of the OWC AP; and providing the digital credential associated information to a wireless local area network (WLAN) AP associated with the OWC AP for authentication of a request from the user device to access the WLAN.

According to another embodiment, a computer program product is provided for authenticating information over wireless networks (WLANs). The computer program product is tangibly stored on a non-transient machine-readable medium and comprises machine-executable instructions. When executed on a device, the instructions cause the computer system to generate a digital credential for a user device, the digital credential being used to access a wireless local area network (WLAN); transmit the digital credential to the user device via an optical wireless communication (OWC) access point (AP), the user device being located in a coverage area of the OWC AP; and provide the digital credential associated information to a wireless local area network (WLAN) AP associated with the OWC AP for authentication of a request from the user device to access the WLAN.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, same or similar reference numerals represent the same or similar element.

DETAILED DESCRIPTION

WLAN has found widespread use in public spaces. Businesses, which provide goods and services to customers, may utilize wireless technology for telecommunications such as mobile phones, in order to receive payments from the customers. When a user of the mobile phone wants to access the WLAN, the user is required to provide a Mobile Subscriber International ISDN/PSTN Number (MSISDN) to an access point (AP) of the WLAN. Then, the AP may forward the MSISDN to an authentication server associated with the AP for generating a verification code for the user. The authentication server in turn communicates with a mobile operator providing the MSISDN so that the mobile operator may transmit the generated verification code to the user. Finally the user must manually enter the verification code into his/her user device. Operations and interactions of multiple parties are very likely to cause long duration of the authentication, thereby degrading the user experience. Embodiments of the present invention dislose methods and systems for the authentication for WLANs. More specifically, a Li-Fi broadcast by a router is applied to find a customer location; to generate a unique ID identification; and to facilitate WiFi authentication. Furthermore, a payment tool works in conjunction with the location and the unique ID, which is used to login to the WiFi, in order to complete a transaction between the customer and a business.

The present invention will now be described with reference to embodiments of the present invention. It is to be understood that these embodiments are described only for the purpose of illustration and to help those skilled in the art to understand and implement the present invention, without suggesting any limitations as to the scope of the invention. The invention described herein can be implemented in various manners other than the ones describe below.

As used herein, the term "includes" and its variants are to be read as inclusive terms to mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
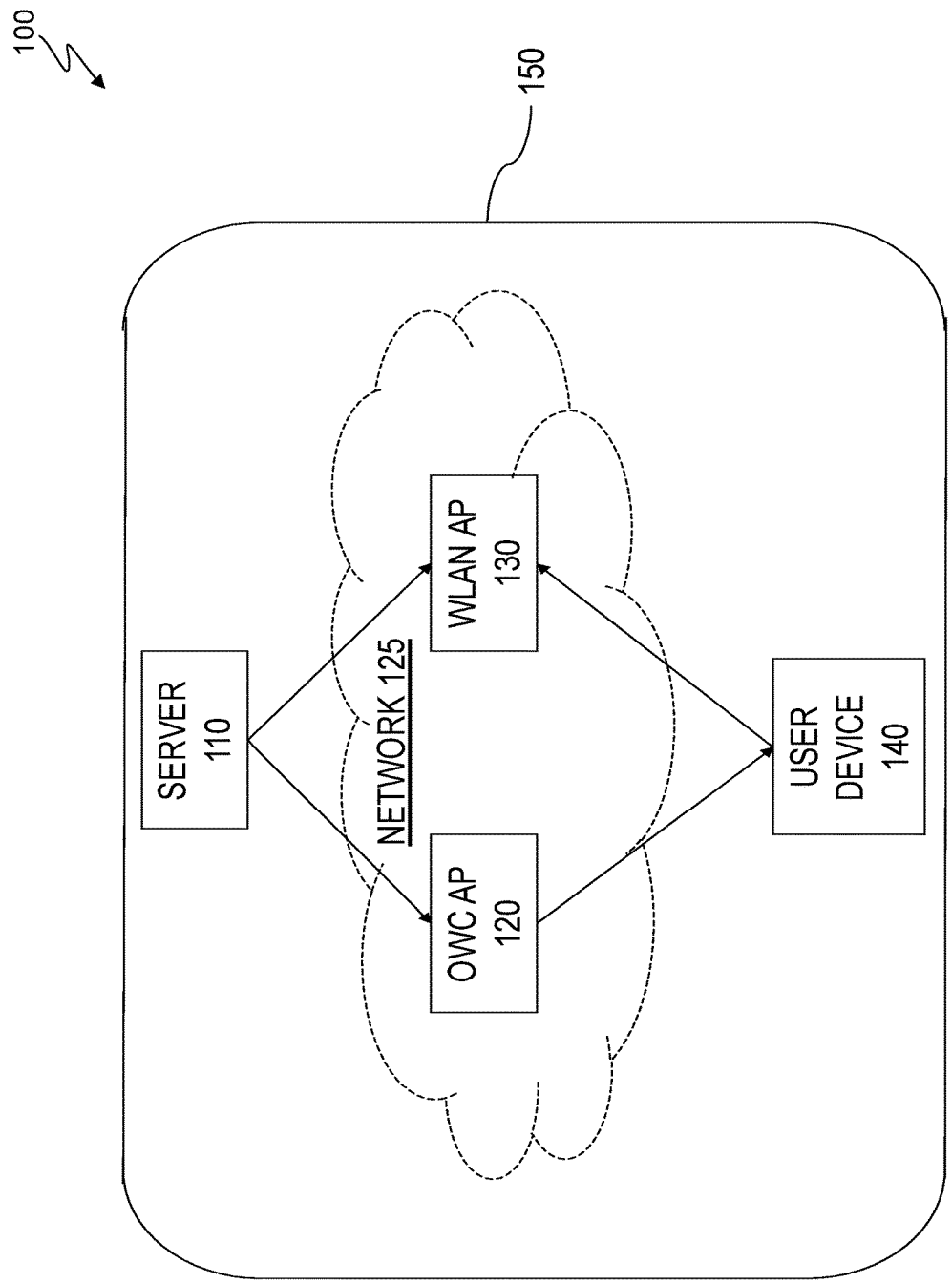
FIG. 1 is an environment in which embodiments of the present invention can be implemented, in accordance with an embodiment of the invention.

FIG. 1 shows environment 100 in which embodiments of the present invention can be implemented. As shown, the environment 100 includes a server 110; an access point (AP) of an optical wireless communication (OWC) network, which is depicted as OWC AP 120; an access point (AP) of a wireless local area network (WLAN), which is depicted as WLAN AP 130; and user device 140. OWC AP 120 and WLAN AP 130 are able to communicate with server 110 and user device 140 over network 125.

Figure 5:
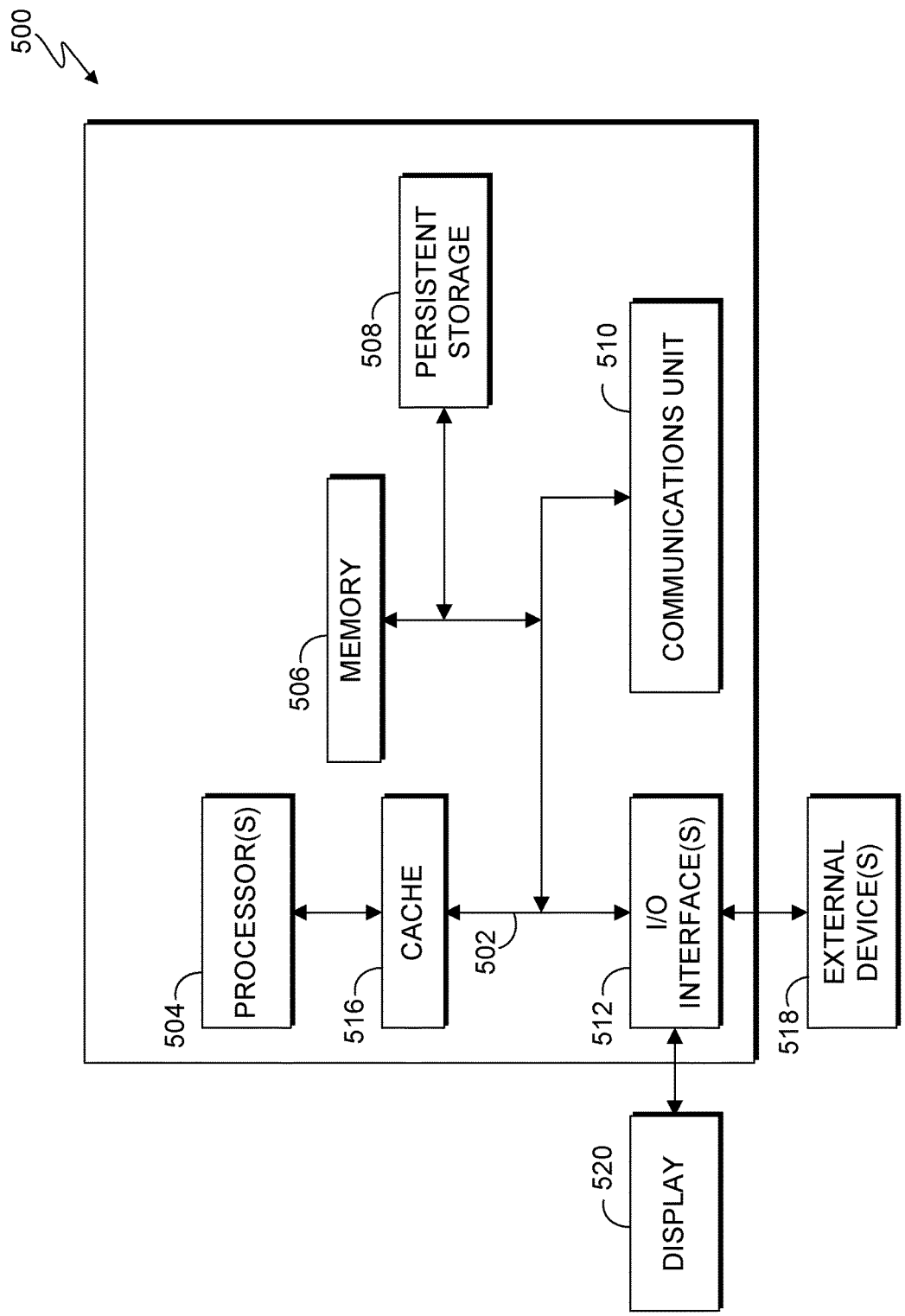
FIG. 5 depicts a block diagram of internal and external components of a computing device, in accordance with an embodiment of the present invention.

The actor of the invention is setup 150, which incorporates the following data processing structures/components: server 110, OWC AP 120, WLAN AP 130, and user device 140. For FIG. 2 and FIG. 3, it is to be implied that the actor is setup 150. Setup 150 invokes server 110 to perform the steps of FIG. 2. Setup 150 invokes server 110 to perform the steps of FIG. 3. Network 125 is not necessarily incorporated into setup 150. The data processing structures/components are electronic devices or computer systems which are necessary to implement the embodiments of the present invention. These type of data of processing structures/components are depicted in FIG. 5.

Network 125 supports, for example, a local area network (LAN), a wide area network (WAN) such as the Internet, or a combination of the two, and can include wired, wireless, or fiber optic connections. In an exemplary embodiment, network 125 supports two types of network—an optical wireless communication (OWC) and a wireless local area network (WLAN). In general, network 125 can be any combination of connections and protocols that will support communication between server 110, user device 140, OWC AP 120, and WLAN AP 130.

Server 110 is a machine which manages or otherwise controls the operation of the WLAN and/or the OWC network. In some embodiments, server 110 may be associated with the OWC network and the WLAN. In other embodiments, there may be multiple units of server 110, where a first unit of server 110 is used to manage the WLAN and a second unit of server 110 is used to manage the OWC network.

User device 140 may be any type of device with wireless communication capability. Examples of the user device 140 include, but are not limited to, user equipment (UE), a mobile phone, a laptop, a tablet computer, a portable digital assistant (PDA), a wearable device, or the like.

By accessing OWC AP 120, server 110 can gain access to the OWC and thus use the OWC network to communicate with user device 140. An OWC network is a communication network which uses light waves, such as visible light, infra-red, near ultraviolet or the like, as a communication medium.

By accessing WLAN AP 130, user device 140 can gain access to the WLAN and thus, use the WLAN network to communicate with server 110. As known, the WLAN may operate according to IEEE802.11 standard wireless protocol, for example. The 802.11 standard wireless protocol may include a set of protocols, such as IEEE 802.11a, 802.11b, 802.11g, 802.11n, and 802.11ac protocols, which operate at different spectrum bands and/or different multiplexing or spread spectrum schemes to deliver various bit rates to devices on a wireless network.

In accordance with embodiments of the present disclosure, the OWC network may be used to facilitate authentication of user device 140 at WLAN AP 130. To this end, server 110 associates the OWC network and the WLAN through OWC AP 120 and WLAN AP 130. Server 110 generates a digital credential for WLAN authentication and sends the digital credential to user device 140 via OWC AP 120. In other words, the digital credential is provided to user device 140 by means of optical communication. Additionally, server 110 provides the digital credential to WLAN AP 130. As such, user device 140 may provide the digital credential to WLAN AP 130 for authentication upon user device 140 receiving one or more requests to access the WLAN.

Although environment 100 as shown in FIG. 1 includes one unit of server 110 and one unit of user device 140, this is merely for the purpose of illustration without suggesting any limitation to the scope of the present disclosure. There may be any suitable number of units of user devices 140 in communication with OWC AP 120 and WLAN AP 130. Moreover, there may be more than unit of server 110. As described above, it is possible to use two units of servers 110, one for the OWC network and the other for the WLAN. In this case, the digital credential may be generated by the server for the OWC network and then provided to the server for the WLAN, which in turn forwards the digital credential to WLAN AP 130.

Although environment 100 as shown in FIG. 1 includes one unit of OWC AP 120 and one unit of WLAN AP 130, this is merely for the purpose of illustration without suggesting any limitation to the scope of the present disclosure. Environment 100 may include multiple units of OWC AP 120 and/or multiple units of WLAN AP 130. For example, it is known that the coverage area of the WLAN is usually larger than the coverage area of the OWC network. Thus, in those embodiments where environment 100 is an indoor environment, it is possible to have a single unit of WLAN AP 130 and multiple units of OWC AP 120.

Figure 2:
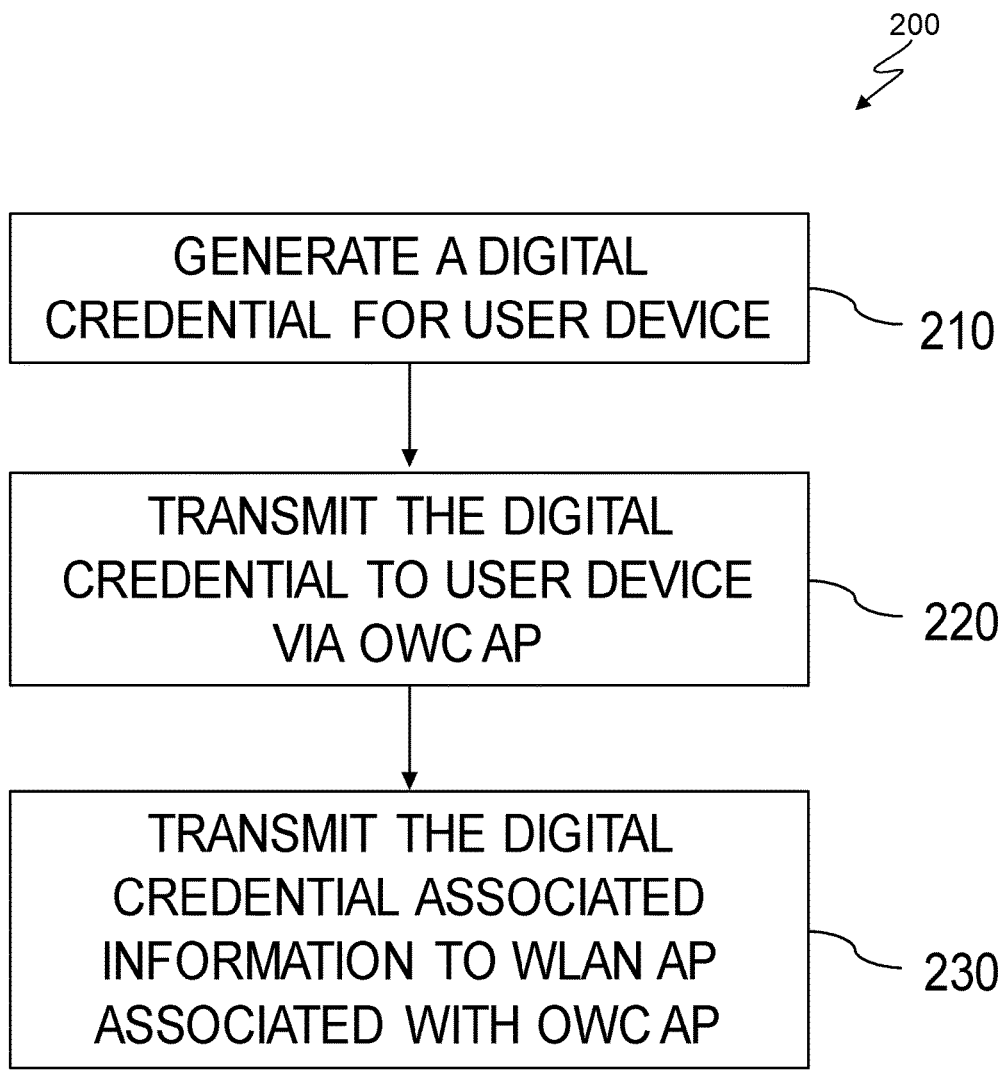
FIG. 2 is a flowchart of a first method for authenticating data, in accordance with embodiments of the present invention.

FIG. 2 shows a flowchart of a method for WLAN authentication in accordance with embodiments of the present invention. Method 200 may be implemented by a server hosting or managing the OWC network reminiscent of server 110, as shown in FIG. 1. Server 110 is invoked by setup 150 in order to perform step 210, step 220, and step 230 of method 200.

In step 210, server 110 generates a digital credential for user device 140 which is located in a coverage area of OWC AP 120. The digital credential may be used to access a WLAN. In the context of the present disclosure, the "digital credential" may include any means of authentication method, including, but are not limited to, a token, a username/a password, a user certificate, and the like.

In some embodiments, the digital credential may be generated in response to the access of user device 140 to OWC AP 120. OWC AP 120 may broadcast information of the OWC network, such as an identifier of OWC network and an identifier of OWC AP 120. When user device 140 is in the coverage area of OWC AP 120, user device 140 can detect signals from OWC AP 120 to obtain the information of the OWC network. Based on the identifier of the OWC network, user device 140 may access the OWC network via OWC AP 120, with or without a password. Then OWC AP 120 may transmit a message to server 110, indicating access to user device 140. In response, server 110 may generate the digital credential for user device 140.

In some embodiments, the digital credential is generated based on an identifier of user device 140. Specifically, the identifier may be unique to user device 140. Examples of the unique identifier include, but are not limited to, a Media Access Control (MAC) address of user device 140, an International Mobile Equipment Identity (IMEI) of user device 140, or the like. For example, when sending the request for access to the OWC network, such an identifier may be provided by user device 140 to OWC AP 120. As will be described in the following paragraphs, by generating and using the digital credential based on such identifier, the network security of the WLAN will be improved because another user device cannot pass the authentication even if it obtains the credential.

In other embodiments, instead of generating the digital credential when user device 110 accesses the OWC network, the generation of digital credential may be triggered by the access request directed to the WLAN. WLAN AP 130 may broadcast information such as an identifier of the WLAN and/or an identifier of WLAN AP 130. Using such information, user device 140 may initiate access to the WLAN by transmitting a request, for the access, to WLAN AP 130. At this point, server 110 may be informed by WLAN AP 130 of the request and then generate the digital credential. In such embodiments, the identifier of user device 140 may be sent to WLAN AP 130, along with the request to access the WLAN. WLAN AP 130 may forward the identifier of user device 140 to server 110 in order to generate the digital credential.

In addition to or instead of an identifier of user device 140, the digital credential may be generated based on other information. In some embodiments, a location of user device 140 may be used to generate the digital credential. In one embodiment, the location may be detected by user device 140 by utilizing a location detection unit therein. The location is then sent to server 110 via OWC AP 120. Alternatively or additionally, the location of user device 140 may be determined by server 110. For example, considering the fact that the light waves as the communication medium cannot penetrate any opaque object, OWC AP 120 may have a limited coverage area. As such, a location of OWC AP 120 may be approximately used as the location of user device 140 which is accessing the OWC network via OWC AP 120. The location of each OWC AP 120 in the environment 100 may be recorded at server 110 and can be retrieved based on the identifier of the OWC AP 120.

In some embodiments, server 110 may generate the digital credential for user device 140 based on the identifier of OWC AP 120. Any other useful information may be used to generate the digital credential or included in the digital credential. For example, server 110 may include time information in the digital credential, indicating a lifetime of the digital credential. As a result, upon expiration of the lifetime, an authentication of the digital credential fails and thus improving the security of the WLAN.

In step 220, the server 110 transmits the digital credential generated (from step 310) to user device 140 via OWC AP 120. In some embodiments, the digital credential is generated when user device 140 communicates with OWC AP 120. In such embodiments, OWC AP 120 receives the digital credential from the server 110 and then sends the digital credential to user device 140. In other embodiments, if user device 140 has already sent the request for WLAN access to WLAN AP 130, then server 110 may select an appropriate OWC AP 120. Specifically, OWC AP 120, which is associated with the currently used WLAN AP 130 and which is capable of communicating with user device 140, may be selected.

In step 230, server 110 provides the digital credential associated information to WLAN AP 130. In embodiments where user device 140 is in communication with a first unit of OWC AP 120, the digital credential associated information is provided to WLAN AP 130 that is associated with the first unit of OWC AP 120. As described above, the association between OWC AP 120 and WLAN AP 130 may be recorded at server 110. In other embodiments where user device 140 has transmitted the access request to a first unit of WLAN AP 130, the digital credential associated information may be directly sent to the first unit of WLAN AP 130. Specifically, if server 110 does not host WLAN AP 130, then the digital credential associated information may be forwarded by one or more nodes between server 110 and WLAN AP 130. The digital credential associated information may be used by WLAN AP 130 to authenticate the digital credential from user device 140. In some embodiments, the digital credential associated information may be the same as the digital credential. In other embodiments, the digital credential associated information may be different from the digital credential. For example, the digital credential may be obtained by applying a one-way hash function to the digital credential associated information. In other words, the digital credential may be a hash value of the digital credential associated information. In another example, the digital credential associated information may be obtained by performing redundant coding on the digital credential.

In method 200, OWC AP 120 has a limited coverage area. Only user devices within the limited coverage area may access the OWC network to obtain the digital credential for authentication to the WLAN. Thus, the network security of the WLAN can be improved. In addition, by providing the digital credential to user device 140 via the OWC network, it is possible to avoid requiring the user to manually enter the password, and thereby improving the user experience. Moreover, the location of user device 140 accessing the OWC network via the OWC AP 120 can be more readily determined, based on the identifier of the OWC AP 120.

It is to be understood that though step 220 is shown prior to step 230, this is merely for the purpose of illustration without suggesting any limitation as to the scope of the present disclosure. The generated digital credential and associated information may be provided to user device 140 and the WLAN AP 130 in any order or in parallel.

Figure 3:
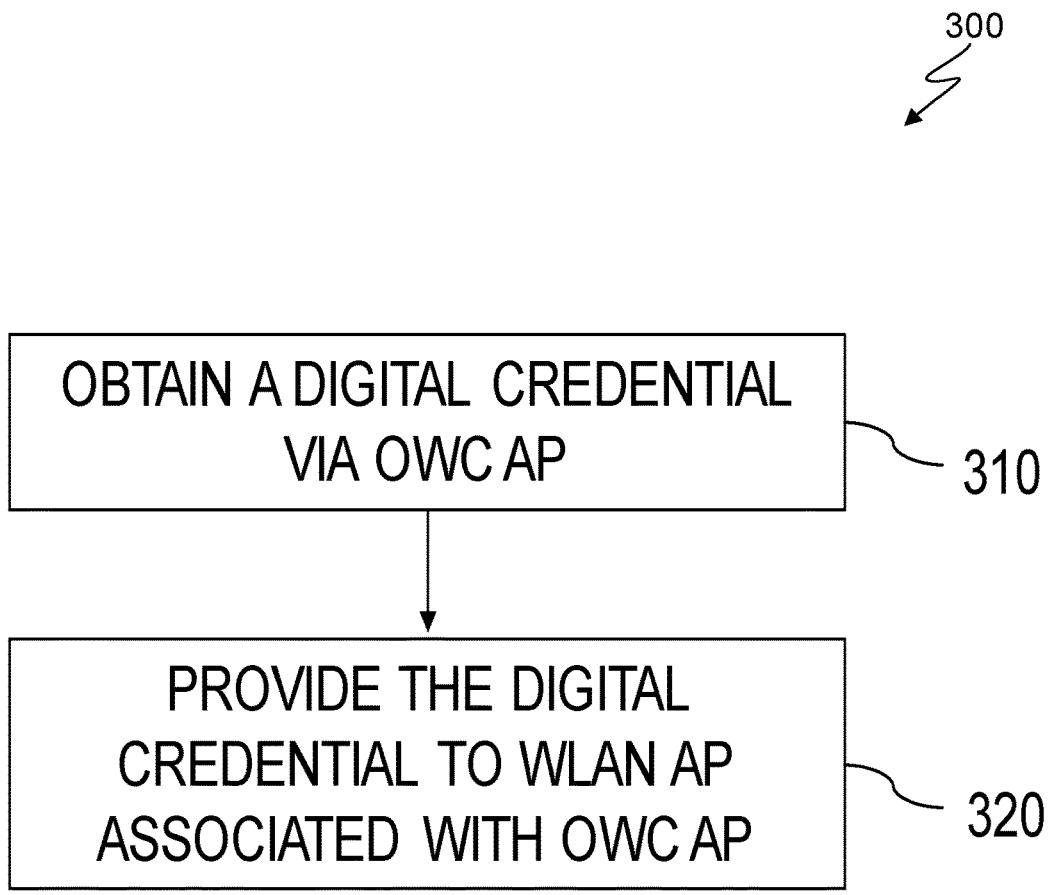
FIG. 3 is a flowchart of a second method for authenticating data, in accordance with embodiments of the present invention.

FIG. 3 is a flowchart of a second method for authenticating data, in accordance with embodiments of the present invention. In an exemplary embodiment, method 300 may be implemented by user device 140. User device 140 is invoked by setup 150 in order to perform step 310 and step 320 of method 300.

In step 310, user device 140 obtains a digital credential via the OWC AP 120. User device 140 is located in a coverage area of the OWC AP 120. As described above, in some embodiments, user device 140 initially attempts to access the OWC network. After obtaining access to the OWC network, user device 140 may receive the digital credential via OWC AP 120. Alternatively, as described above, in some embodiments, user device 140 may attempt to access the WLAN by sending a request to WLAN AP 130, which forwards the request to server 110. Server 110 generates the digital credential for user device 140 and transmits the digital credential to OWC AP 120, which is associated with a currently active unit of WLAN AP 130 and which is able to communicate with user device 140. Server 110 provides the digital credential to the determined OWC AP 120, which in turn transmits the digital credential to user device 140 via the OWC network.

In step 320, user device 140 provides the digital credential to WLAN AP 130 associated with OWC AP 120. By providing the digitial credential, WLAN AP 130 may authenticate an access request sent by user device 140. In some embodiments, the access request for the WLAN may be sent along with the digital credential. Alternatively, the access request for the WLAN has been previously transmitted, as described above.

Figure 4:
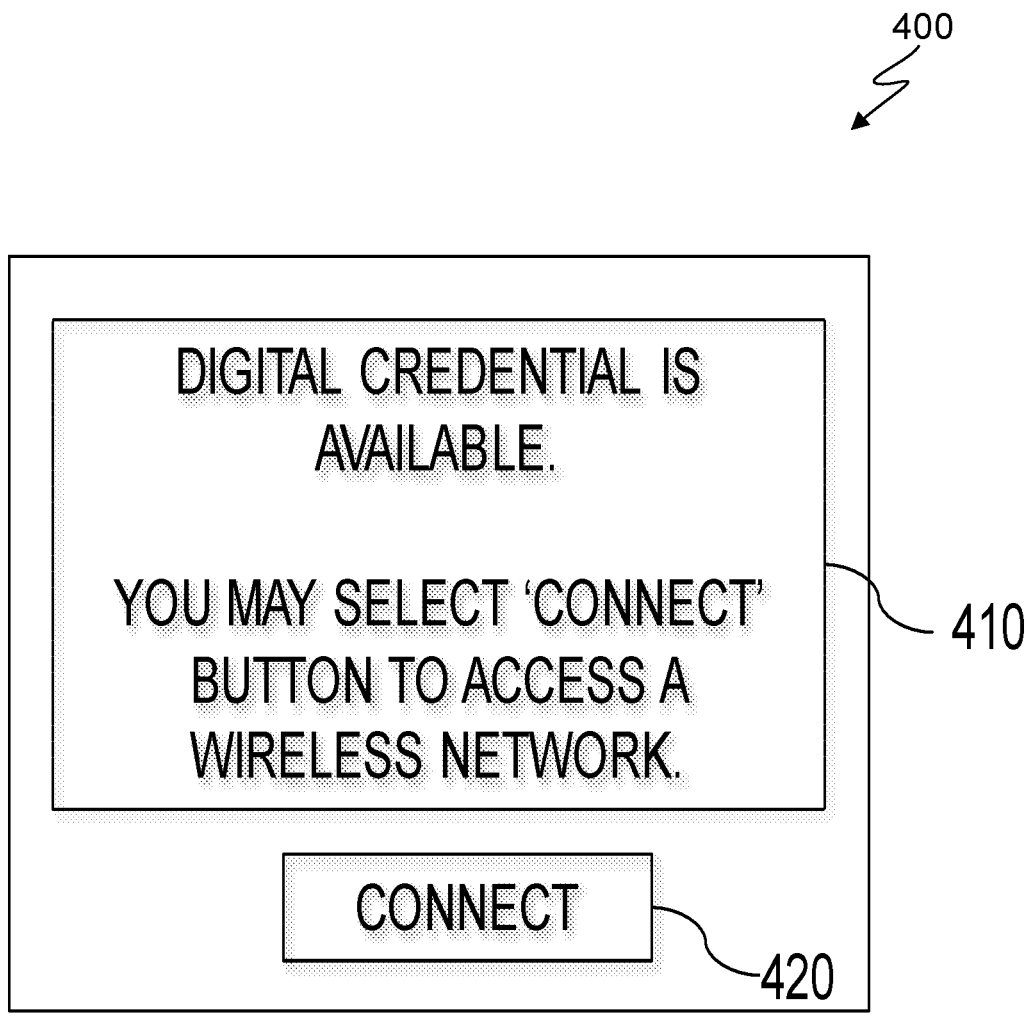
FIG. 4 shows a user interface of a user device which may be utilized in embodiments of the present invention, in accordance with an embodiment of the invention.

FIG. 4 shows a user interface of a user device which may be utilized in embodiments of the present invention, in accordance with an embodiment of the invention.

User interface 400 as shown in FIG. 4 may be presented to the user of user device 140. User interface 400 shows "Digital credential is available" and "You may select 'Connect' button to access a wireless network" at message 410. In response to the user selecting "Connect" button 420, a request for access to WLAN AP 130, having the digital credential automatically loaded therein, is transmitted to WLAN AP 130.

In an exemplary embodiment, setup 150 is being used within a restaurant. The OWC network using visible light as a communication medium is implemented as a Light Fidelity (Li-Fi) network. In addition, the WLAN operates according to IEEE 802.11 standard and is called Wi-Fi network. In this exemplary embodiment, a Li-Fi network version of OWC AP 120 and a Wi-Fi network version of WLAN AP 130 and thus, the Li-Fi network is associated with the Wi-Fi network through the association of OWC AP 120 and WLAN AP 130. The association of OWC AP 120 and WLAN AP 130 is recorded at server 110. In this exemplary embodiment, OWC AP 120 is referred to as Li-Fi OWC AP 120 and WLAN AP 130 is referred to as Wi-Fi WLAN AP 130. In this scenario, a single unit of Wi-Fi WLAN AP 130 and multiple units of Li-Fi OWC AP 120 are deployed within setup 150. For example, software-defined light emitting diode (LED) lamps arranged on a ceiling of the restaurant may serve as Li-Fi OWC AP 120, and a wireless router may serve as the Wi-Fi WLAN AP 130. Some of the LED lamps may be arranged over dining tables of the restaurant. For example, there is a LED lamp above each of the dining tables. Server 110 associates the Li-Fi network with the Wi-Fi network by associating an identifier of Wi-Fi WLAN AP 130 with an identifier of each Li-Fi OWC AP 120. For example, a software-defined LED lamp and a wireless router have respective MAC addresses, and thus the identifiers of the Wi-Fi WLAN AP 130 and Li-Fi OWC AP 120 are the respective MAC addresses associated with Wi-Fi WLAN AP 130 and Li-Fi OWC AP 120, respectively.

When a user carrying user device 140 comes into the restaurant, he/she may select a dining table. Initially, user device 140 has no access to the Li-Fi and Wi-Fi networks. It is assumed that user device 140 first attempts to access the Li-Fi network via the LED lamp over his/her dining table. After accessing the Li-Fi network, user device 140 may communicate with server 110 via Li-Fi OWC AP 120. Server 110 may generate the digital credential based on, for example, the MAC address of user device 140. As described above, the digital credential may be, for example, a hash value of the digital credential associated information.

As described above, the digital credential may be generated based on the location of user device 140. The location of the user device 140 may be determined based on the identifier of Li-Fi OWC AP 120. The identifier of Li-Fi OWC AP 120 is a LED lamp which is located over the user's dining table and user device 140 accesses the Li-Fi network. Specifically, each of the dining tables in a restaurant may be provided with an identifier, such as "Table 1," "Table 2," or the like. The location, identifier and the LED lamp of a dining table may be associated with each other. The LED lamp may be represented by its unique identifier. In this way, the location of user device 140 (which in turn is the location of the user) may be determined based on the identifier of the LED lamp over the dining table.

Server 110 transmits the digital credential to user device 140 via the Li-Fi OWC AP 120. In addition, server 110 provides the digital credential associated information to the Wi-Fi router (which is another version of Wi-Fi WLAN AP 130). In order to use the Wi-Fi network, user device 140 provides the digital credential to the Wi-Fi router. The Wi-Fi router uses the digital credential associated information obtained from server 110 to authenticate the request sent by user device 140. For example, the digital credential is a hash value of the digital credential associated information. Then, the Wi-Fi router applies the same one-way hash function to the digital credential associated information, as server 110 applies the same one-way hash function, in order to obtain the hash value of the digital credential associated information. Thus, the Wi-Fi router may authenticate the request by comparing the obtained hash value with the digital credential provided by user device 140. Responsive to successful authentication, user device 140 is allowed to access the Wi-Fi network and in-turn access the Internet.

The owner of the restaurant may determine the fee due for the dinner based on the location of the user and transmit the fee due to the user via Wi-Fi WLAN AP 130. From the perspective of the user, the Li-Fi network is considered a trusted network and thus the Wi-Fi network associated with the Li-Fi network is also considered a trusted network. Thus, in response to receiving the fee due, the user sees the fee due on user device 140 and transmit a payment for the fee due via Wi-Fi WLAN AP 130. In this way, a secure payment may be enabled and less interaction is needed for the user.

FIG. 5 depicts a block diagram of components of a computing device, generally designated 500, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Program instructions and data used to practice embodiments of the present invention may be stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for authenticating information over wireless local area networks (WLANs) comprising the steps of:
    receiving, by one or more processors, a request by a user device to access a wireless local area network (WLAN) via a WLAN access point (WLAN AP), wherein the request includes an identifier of the user device;
    determining, by one or more processors, a location of a user device based on a location of an optical wireless communication access point (OWC AP), wherein the location of the user device is within a coverage area of the OWC AP;
    generating, by one or more processors, a digital credential for the user device based on the identifier of the user device, wherein the digital credential is used to access the WLAN;
    sending, by one or more processors, the location of the user device to the OWC AP;
    transmitting, by one or more processors, the digital credential to the location of the user device via the OWC AP;
    sending, by one or more processors, information associated with the digital credential to the WLAN AP associated with the OWC AP; and
    authenticating, by one or more processors, based on the (i) the digital credential and (ii) the identifier, the request by the user device to access the WLAN.

2. The method of claim 1, wherein generating the digital credential comprises:
    generating, by one or more processors, the digital credential based on a location of the user device, wherein the digital credential comprises time-relevant information indicative of a lifetime of the digital credential.

3. The method of claim 1, further comprising:
    processing, by one or more processors, the digital credential as data which is equivalent to the information associated with the digital credential.

4. The method of claim 1, wherein authenticating, by one or more processors, the request by the user device to access the WLAN further comprises:
    receiving, by one or more processors, the digital credential from the user device.

5. A computer system for authenticating information over wireless area networks (WLANs), the computer system comprising:
    one or more computer processors;
    one or more computer readable storage media;
    program instructions stored on the one or more computer readable storage media for execution by at least one of the one or more processors, the program instructions comprising instructions to:
    receive a request by a user device to access a wireless local area network (WLAN) via a WLAN access point (WLAN AP), wherein the request includes an identifier of the user device;
    determine a location of a user device based on a location of an optical wireless communication access point (OWC AP), wherein the location of the user device is within a coverage area of the OWC AP;
    generate a digital credential for the user device based on the identifier of the user device, wherein the digital credential is used to access the WLAN;
    send the location of the user device to the OWC AP;
    transmit the digital credential to the location of the user device via the OWC AP;
    send information associated with the digital credential to the WLAN AP associated with the OWC AP; and
    authenticate, based on the (i) the digital credential and (ii) the identifier, the request by the user device to access the WLAN.

6. The computer system of claim 5, wherein the instructions to generate the digital credential comprise instructions to:
    generate the digital credential based on a location of the user device, wherein the digital credential comprises time-relevant information indicative of a lifetime of the digital credential.

7. The computer system of claim 5, further comprising instructions to:
    process the digital credential as data which is equivalent to the information associated with the digital credential.

8. The computer system of claim 5, wherein the instructions to authenticate the request by the user device to access the WLAN further comprise instructions to:
    receive the digital credential from the user device.

9. A computer program product for authenticating information over wireless authentic networks (WLANs), the computer program product comprising:
    a computer readable storage medium and program instructions stored on the computer readable storage medium, the program instructions comprising instructions to:

receive a request by a user device to access a wireless local area network (WLAN) via a WLAN access point (WLAN AP), wherein the request includes an identifier of the user device;

determine a location of a user device based on a location of an optical wireless communication access point (OWC AP), wherein the location of the user device is within a coverage area of the OWC AP;

generate a digital credential for the user device based on the identifier of the user device, wherein the digital credential is used to access the WLAN;

send the location of the user device to the OWC AP;

transmit the digital credential to the location of the user device via the OWC AP;

send information associated with the digital credential to the WLAN AP associated with the OWC AP; and authenticate, based on the (i) the digital credential and (ii) the identifier, the request by the user device to access the WLAN.

10. The computer program product of claim 9, wherein the instructions to generate the digital credential comprise instructions to:

generate the digital credential based on a location of the user device, wherein the digital credential comprises time-relevant information indicative of a lifetime of the digital credential.

11. The computer program product of claim 9, further comprising instructions to:

process the digital credential as data which is equivalent to the information associated with the digital credential.

12. The computer program product of claim 9, wherein the instructions to authenticate the request by the user device to access the WLAN further comprise instructions to:

receive the digital credential from the user device.

* * * * *